United States Patent
Armengaud

(10) Patent No.: US 7,184,649 B2
(45) Date of Patent: Feb. 27, 2007

(54) COMMERCIAL-BREAK DETECTION DEVICE

(75) Inventor: Eric Armengaud, Nogent sur Marne (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1276 days.

(21) Appl. No.: 09/862,289

(22) Filed: May 22, 2001

(65) Prior Publication Data

US 2001/0055463 A1 Dec. 27, 2001

(30) Foreign Application Priority Data

May 23, 2000 (EP) .................. 00890165

(51) Int. Cl.
*H04N 5/91* (2006.01)
(52) U.S. Cl. ........................... 386/95; 386/125
(58) Field of Classification Search ............ 386/46, 386/94, 95, 125; 358/908
See application file for complete search history.

(56) References Cited

U.S. PATENT DOCUMENTS 5,450,139 A * 9/1995 Haraguchi et al. .......... 348/705
5,987,210 A 11/1999 Iggulden et al. .............. 386/46
6,002,831 A * 12/1999 Tada et al. ..................... 386/46

* cited by examiner

Primary Examiner—Huy Nguyen

(57) ABSTRACT

In a commercial-break detection device (7) for the detection of commercial-break information (WBI) present in picture information (RI) of a television signal (FS), having detection means (8) arranged to receive the television signal (FS) and adapted to detect black-frame information (SBI) in the picture information (BI) of the television signal (FS), and having memory means (9) for the storage of black-frame lime information (SZI) for each one of at least two units of detected black-frame information (SBI), and having analysis means (10) for analyzing the stored black-frame time information (SZI) and for determining commercial-break position information (WP1, WP2) identifying the commercial-break information (WBI) in the picture information (BI), the detection means (8) are now adapted to detect a fade-out (FO), in which fade-out (FO) a luminance signal (Y) of the picture information (BI) decreases during a fade-out time (FT) until the picture information (BI) is formed by the black-frame information (SBI), and the detection means (8) are adapted to determine fade black-frame time information (FI) and edge black-frame time information (KI), the fade black-frame time information (FI) identifying black-frame information (SBI) which is directly preceded by a fade-out (FO), and the edge black-frame time information (KI) identifying black-frame information (SBI) which is not directly preceded by a fade-out (FO), and the analysis means (10) are adapted to separately analyze the stored fade black-frame time information (FI) and the stored edge black-frame time information (KI), in order to determine the commercial-break position information (WP1, WP2).

7 Claims, 2 Drawing Sheets

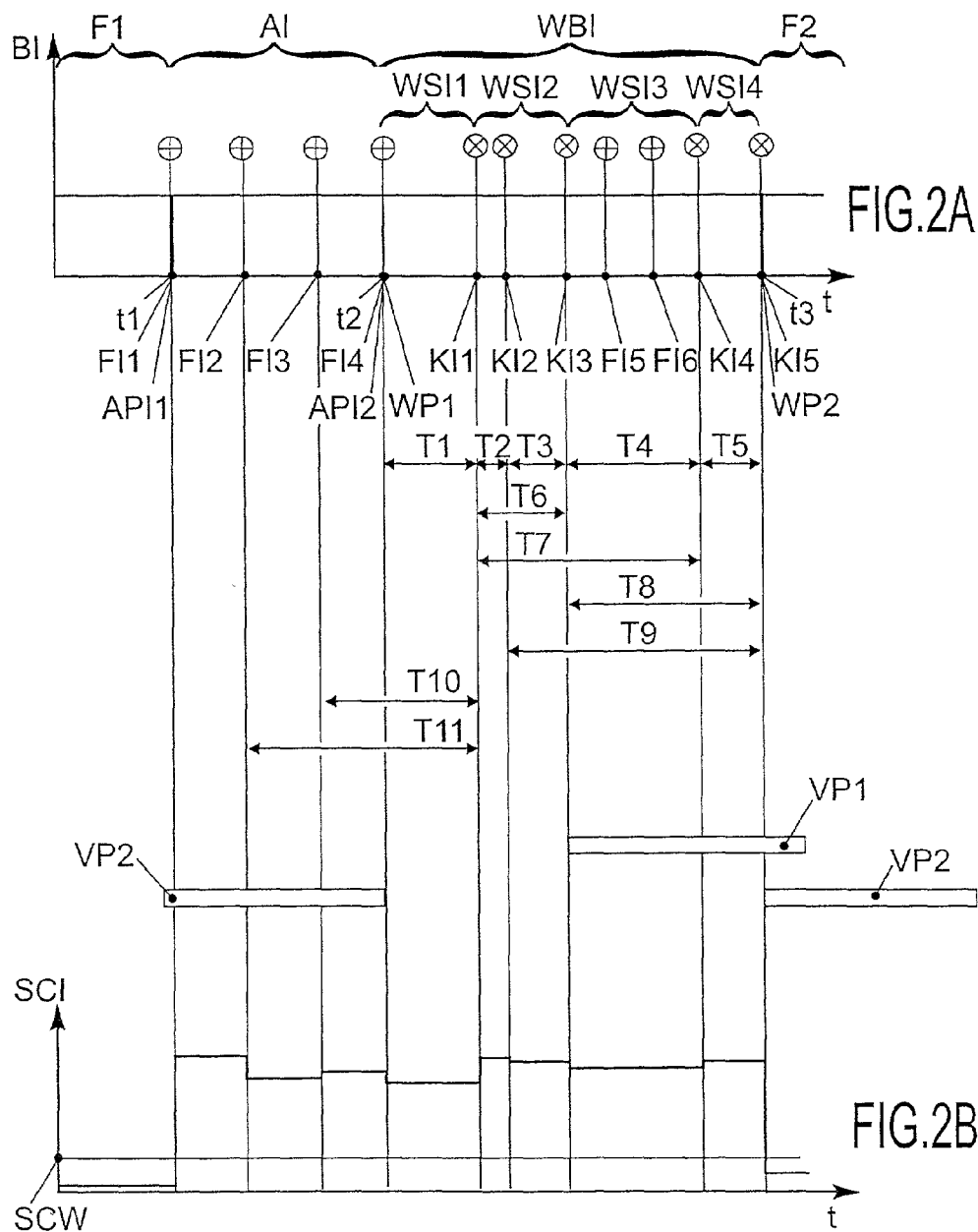

COMMERCIAL-BREAK DETECTION DEVICE

BACKGROUND AND FIELD OF THE INVENTION

The invention relates to a commercial-break detection device for the detection of commercial-break information present in picture information of a television signal, having detection means arranged to receive the television signal and adapted to detect black-frame information in the picture information of the television signal, and having memory means for the storage of black-frame time information for each one of at least two units of detected black-frame information, and having analysis means for analyzing the stored black-frame time information and for determining commercial-break position information identifying the commercial-break information in the picture information.

The invention further relates to a recording and reproducing apparatus having recording means for recording film information and picture information of a television signal, which picture information includes commercial-break information, and having reproducing means for reproducing the film information and for skipping the commercial-break information during reproduction of the picture information of the recorded television signal.

Such a commercial-break detection device of the type defined in the opening paragraph and such a recording and reproducing apparatus of the type defined in the second paragraph are known from the document U.S. Pat. No. 5,987,210 are known and are formed by a video recorder. The known video recorder has recording means for recording a television signal on a magnetic tape and reproducing means for reproducing a recorded television signal. Magnetic tape transport means of the video recorder are adapted to provide transport of the magnetic tape with a normal transport speed during the recording and reproduction of the television signal and to provide transport of the magnetic tape with a winding transport speed when reproduction of a part of the recorded television signal is to be skipped.

A television signal comprises picture information, sound information and additional information, such as for example teletext information. The television signal may transmit a television film as film information, which may be interrupted by a plurality of units of commercial-break information of a plurality of commercial breaks. Each commercial break usually comprises a plurality of commercial messages.

The known video recorder includes a commercial-break detection device adapted to detect a commercial break and to mark the recording position of the commercial break on the magnetic tape by commercial-break position information. During the reproduction of the recorded television signal the recording positions of the magnetic tape, which are marked with the commercial-break position information, are skipped by transport of the magnetic tape at the winding transport speed. Thus, the commercial messages are skipped automatically without the intervention of the user of the video recorder.

The known commercial-break detection device includes detection means adapted to detect black-frame information in the picture information. Black-frame information is present in the picture information when the luminance signal of the television signal has an amplitude value below a black level threshold value during a complete field. When the detection means detect black-frame information they supply black-frame time information representative of the time relationship or position of the detected black-frame information in the television signal or, alternatively, of the recording position of the blackframe information on the magnetic tape. Black-frame time information supplied by the detection means is stored in memory means of the video recorder.

The known commercial-break detection device further includes analysis means adapted to analyze whether the time difference between adjacent units of frame picture time information corresponds to a predetermined preset time difference. Thus, it is checked whether black-frame information is followed by further black-frame information within 35 seconds or whether black-frame information is followed by the subsequent black-frame information within a preset time difference of 43 seconds to 50 seconds. These preset time differences are based on the fact that commercials usually have a length of 30 seconds, 45 seconds or 60 seconds.

The known recording and reproducing apparatus and the known commercial-break detection device are found to have the drawback that television films comparatively often contain black-frame information that can lead to an erroneous detection result, owing to which parts of the recorded television film are skipped during playback.

BRIEF SUMMARY OF THE INVENTION

It is an object of the invention to provide a commercial-break detection device and a recording and reproducing apparatus which detect commercial breaks in a television signal in a reliable manner. In a commercial-break detection device of the type defined in the opening paragraph this object is achieved in that the detection means are adapted to detect a fade-out, in which fade-out a luminance signal of the picture information decreases during a fade-out time until the picture information is formed by the black-frame information, and the detection means are adapted to determine fade black-frame time information and edge black-frame time information, the fade black-frame time information identifying black-frame information which is directly preceded by a fade-out, and the edge black-frame time information identifying black-frame information which is not directly preceded by a fade-out, and the analysis means are adapted to separately analyze the stored fade black-frame time information and the stored edge black-frame time information, in order to determine the commercial-break position information.

In a recording and reproducing apparatus of the type defined in the second paragraph this object is achieved in that a commercial-break detection device as defined in the preceding paragraph is included.

The invention is based on the observation that black-frame information can be detected both in commercial breaks and in television films but that said information differs in that black-frame information of a television film is nearly always preceded by a so-called fade-out and black-frame information of a commercial break is not preceded by a fade-out. Therefore, in accordance with the invention, the analysis means first of all analyze the black-frame information which is not directly preceded by a fade-out for compliance with preset time differences in order to detect a commercial break.

This has the advantage that a commercial-break detection device for a recording and reproducing apparatus is obtained which detects commercial breaks in a particularly reliable manner and which supplies commercial-break position information which identifies a detected commercial break and is stored by the recording and reproducing apparatus.

The measures as defined in claim 2 have the advantage that not only directly succeeding units of black-frame edge information are monitored for compliance with preset time differences but each time three, five or even twenty successive units of black-frame edge information. This results in a highly reliable detection of commercial breaks, particularly in the case that black-frame information is present not only at the beginning and the end of a commercial message but also within a commercial message.

The measures as defined in claim 3 have the advantage that even when a commercial message within a commercial break is not detected the entire commercial break is automatically skipped during reproduction.

In accordance with the measures as defined in claim 4 it is checked whether adjacent a detected commercial break a unit of detected black-frame information appears which precedes a fade-out and which appear within a second preset time difference, i.e. which are in direct temporal proximity. In accordance with claim 4 this black-frame information is also identified as commercial-break position information.

This has the advantage that the first commercial message of a commercial break, which first commercial message is sometimes not identified by black-frame information without a preceding fade-out, is identified by commercial-break position information.

It is to be noted that a commercial break is very often preceded and followed by a few scenes of a television film to be broadcast with the aid of a television signal in the near future by way of announcement information. The user of a recording and reproducing apparatus is normally not interested in a reproduction of these scenes of a television film which usually has been broadcast already at the time that the recorded television film is replayed. It is therefore desirable that this announcement information which may precede and follow a commercial break in the television signal is also skipped during reproduction. These scenes are usually characterized by black-frame information including a preceding fade-out and by a high rate of change of scenes.

In accordance with the measures as defined in claim 5 it is checked whether a very high rate of change of scenes can be detected adjacent a detected commercial break, which is characteristic of the number of scene changes between two units of black-frame information. In accordance with claim 5 such black-frame information is laid down as announcement position information to identify announcement information.

This has the advantage that not only each commercial break but also any announcement information preceding or following a commercial break can be skipped automatically during the reproduction of the recorded television signal. As a result of the identification of the announcement information by announcement position information and of the identification of the commercial-break information by commercial-break position information it is also possible to automatically skip only the commercial breaks or only the announcement information, as desired by the user.

BRIEF DESCRIPTION OF THE DRAWINGS

The invention will now be described in more detail with reference to the drawings, which show an embodiment given by way of example but to which the invention is not limited.

FIG. 2 shows signal waveforms of picture information contained in the television signal and of scene change information.

DETAILED DESCRIPTION OF THE INVENTION

Figure 1:
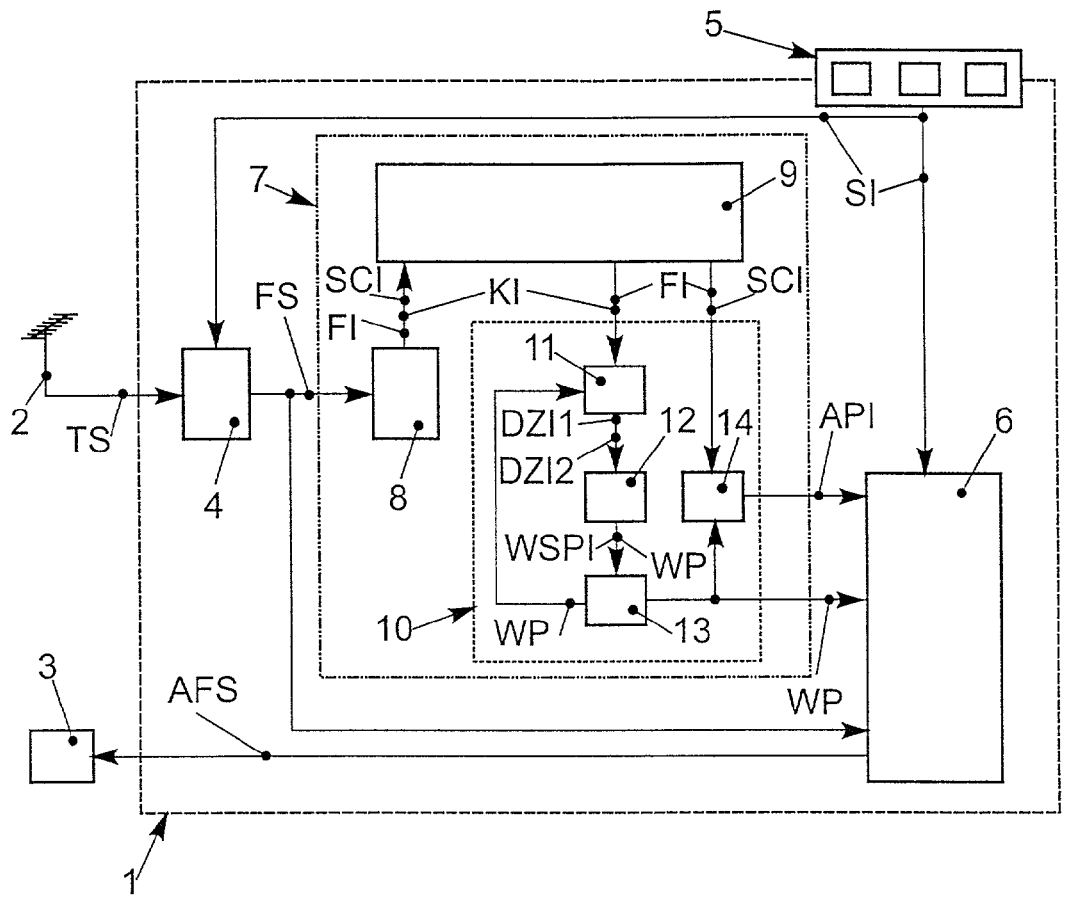
FIG. 1 is a block diagram which shows a hard-disk recorder for recording and reproducing a television signal, which recorder includes an commercial-break detection device for detecting and identifying commercial-break information contained in the television signal.

FIG. 1 shows a hard-disk recorder 1, an antenna 2 and a television set 3. The hard-disk recorder 1 is adapted to record a television signal FS contained in the antenna signal TS and to reproduce a recorded television signal AFS. The reproduced television signal AFS can be displayed by means of the television set.

The hard-disk recorder 1 includes a tuner 1, a keyboard 5 and recording and reproducing means 6. The antenna signal TS can be applied to the tuner 4 and a user of the hard-disk recorder 1 can select the television signal FS of a television station by means of the keyboard 5, by the application of control information SI. The selected television signal FS can be applied to the recording and reproducing means 6.

The recording and reproducing means 6 include a signal processing stage for processing the television signal FS to be recorded and for processing the reproduced television signal AFS, as is commonly known. The recording and reproducing means 6 include a hard disk as recording medium for the recording of the processed television signal FS. By means of the keyboard 5 the user can supply control information SI to the recording and reproducing means 6 to activate a recording mode and a reproducing mode.

The television signal FS includes picture information BI, sound information and additional information, such as for example teletext information. The picture information BI may include film information FI which is representative of a television film and which may be interrupted by a plurality of units of commercial-break information WBI of commercial breaks and announcement information AI. Each commercial break usually comprises a plurality of units of commercial message information WSI of commercial messages. A commercial message usually has a length or commercial message duration of 10, 15, 20, 30, 40 or 60 seconds.

FIG. 2A shows the picture information BI of the television signal FS in the present example as a function of time. The picture information BI contains first film information F1 of the film "Casablanca" until an instant t1. At the instant t1 the film is interrupted and until an instant t2 some short scenes of the film "The Babysitter" are included in the picture information BI as announcement information AI. The announcement information AI serves to announce that the film "The Babysitter" will be broadcast by means of the television signal FS at the same time next day.

From the instant t2 till an instant t3 a total of four units of commercial message information WSI1, WSI2, WSI3 and WSI4 of four commercial messages are transmitted, which together form the commercial break information WBI of a commercial break. The commercial message information WSI1 and the commercial message information WSI2 have a length of 20 seconds each, the commercial message information WSI3 has an unusual length of 27 seconds and the commercial message information WSI4 has a length of 10 seconds. At the instant t3 the film "Casablanca" is continued as second film information F2.

FIG. 2B shows scene change information SCI containing information about the rate at which the scenes in the picture information BI change, i.e. how long scenes are relative to a customary scene length. The scene change information SCI is determined for each time interval between two sequences of black-frame information SBI, as will be elucidated hereinafter. As is apparent from FIG. 2B, the announcement information AI and the commercial-break information WBI exhibit comparatively many short scenes, as a result of which the scene change information SCI continually exceeds a scene change threshold value SCW.

Users of the hard-disk recorder 1 are not interested in the reproduction of the commercial-break information WBI and usually neither in the reproduction of the announcement information AI during the replay of a recorded television signal AFS, such as for example the film "Casablanca". Normally, they are not interested in the reproduction of the announcement information AI for the reason that the film announced in the announcement information AI, such as for example the film "The Babysitter" has usually been broadcast already at the time that the recorded film "Casablanca" is replayed.

The hard-disk recorder 1 now includes a commercial-break detection device 7 for detecting and marking the commercial-break information WBI and the announcement information AI contained in the picture information BI of the television signal FS. In the reproducing mode of the hard-disk recorder 1 commercial-break information WBI and/or announcement information AI thus marked are skipped automatically and the user consequently views the film "Casablanca" without annoying interruptions.

The commercial-break detection device 7 has detection means 8 arranged to receive the television signal FS and adapted to detect black-frame information SBI in the picture information BI of the television signal FS. Such detection means 7 are known, for example, from the document U.S. Pat. No. 5,987,210, which is incorporated in the present document by reference.

Figure 3:
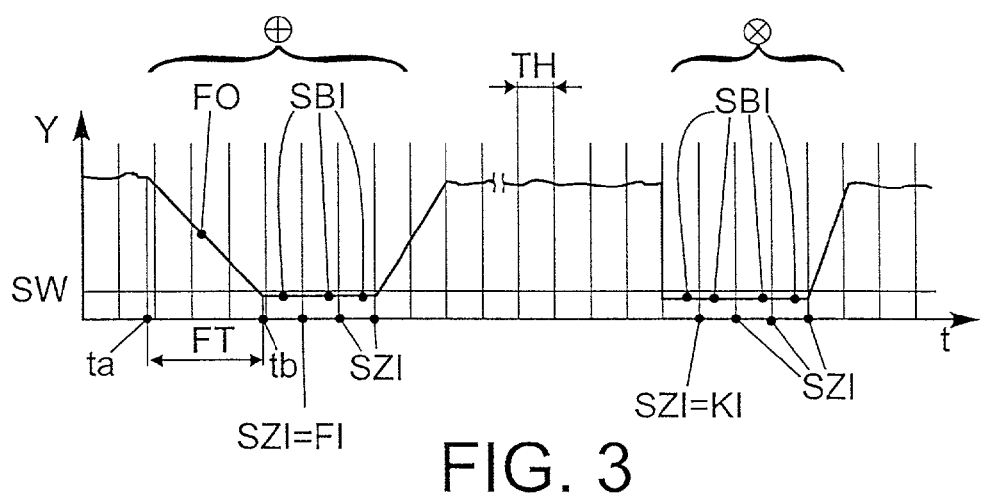
FIG. 3 shows a signal waveform of a luminance signal which is contained in the television signal and in which fade black-frame information and edge black-frame time information can be laid down.

The television signal FS comprises a luminance signal Y and a color signal, as is commonly known. FIG. 3 shows an example of the waveform of the luminance signal Y of the television signal FS as a function of time. The picture information BI contains black-frame information SBI when the luminance signal Y of the television signal FS has an amplitude value below a black level threshold value SW for the duration of one field period TH of a complete field (50 fields per second in Europe).

At the end of each field that meets the aforementioned requirement the detection means 8 can supply black-frame time information SZI which represents the time relationship of the detected black-frame information SBI in the television signal FS, i.e. the recording position of this field on the hard disk. Usually, the picture information BI includes a sequence of 5 to 75 fields of black-frame information SBI with a total duration of ¹⁄₁₀ to 1.5 seconds.

It is to be noted that the luminance signal Y of the picture information BI may be below the black level threshold value SW for a longer time in the case of very dark scenes in the film, for example night scenes. However, such film scenes usually have a length of at least 2 seconds and can therefore be distinguished from a sequence of maximum 75 consecutive units of black-frame information SBI, which has a maximum total length of 1.5 second.

In order to distinguish such dark scenes from a sequence of black-frame information SBI the detection means 8 include a counting stage. The counting stage of the detection means 8 is adapted to count consecutive units of black-frame information SZI and to compare the count with a threshold value WW=75. Thus, the detection means are adapted to distinguish a dark scene of a film from a sequence of black-frame information SBI.

The detection means 8 are further adapted to determine the scene change information SCI, the number of scene changes in the film occurring between two sequences of black-frame information SBI being compared with a customary scene length. Thus, the scene change information SCI has a value which is constant between two sequences of black-frame information SBI, as is shown in FIG. 2B.

The commercial-break detection device 7 includes memory means 9 for the storage of black-frame time information SZI and scene change information SCI supplied by the detection means 8. In the present case, the memory means 9 ate formed by a so-called RAM (Random Access Memory).

The commercial-break detection device 7 further includes analysis means 10 for analyzing the stored black-frame time information SZI and determining commercial-break position information WP which marks the commercial-break information WBI in the picture information BI of the television signal FS. The commercial-break position information WP determined by the analysis means 10 can be supplied to the recording and reproducing means 6 and can be stored by the last-mentioned means. In the reproducing mode of the recording and reproducing means 6 this stored commercial-break position information WP is used to skip recorded commercial-break information WBI.

The detection means 8 are now additionally adapted to detect a fade-out FO, the luminance signal Y of the picture information BI during the fade-out FO decreasing in a fade-out time FT until the picture information BI is formed by the black-frame information SBI. FIG. 3 shows such a fade-out FO of the luminance signal Y, the luminance signal Y steadily decreasing below the black level threshold value SW from an instant ta until an instant tb in the fade-out time FT. The fade-out time FT is then usually ¹⁄₅₀ second (1 field period TH) to one second (50 field periods TH).

The detection means 8 are adapted to determine fade black-frame time information FI and edge black-frame time information KI. As fade black-frame time information FI the black-frame time information SZI is taken of black-frame information SBI which is directly preceded by a fade-out FO, while the number of units of black-frame information SBI directly following this black-frame information SBI should be smaller than the threshold value WW=75. Such sequences of black-frame information SBI, to which fade black-frame time information FI has been assigned, are marked with the symbol ⊕ in FIG. 2 and FIG. 3.

As edge black-frame time information KI the black-frame time information SZI is taken of the black-frame information SBI which is not preceded directly by a fade-out FO or a sudden drop of the luminance signal Y below the black level threshold value SW within a field, if the number of directly following units of black-frame information SBI is smaller than the threshold value. Such sequences of black-frame information SBI, to which edge black-frame time information KI has been assigned, are marked with the symbol ⊗ in FIG. 2 and FIG. 3.

When the commercial-break position information WP is determined the analysis means 10 are now adapted to effect a separate analysis of stored fade black-frame time information FI and edge black-frame time information KI. For this purpose, the analysis means 10 include time difference means 11, test means 12 and logic means 13. The operation of said means will be described in more detail with reference to the following example of use.

The operation of the commercial-break detection device 7 is based on the observation that black-frame information SBI can be detected both in commercial breaks WBI and in announcement information AI as well as film information FI but that said information differs in that sequences of black-frame information SBI of announcement information AI or film information FI are nearly always preceded by a fade-out FO and black-frame information SBI of commercial-break information WBI is not preceded by a fade-out FO. Therefore, during the detection of black-frame information SBI the detection means 8 detect whether this black-frame information is directly preceded by a fade-out FO and the analysis means therefore check whether the sequences (x) of black-frame information SBI which are not directly preceded by a fade-out FO for compliance with preset time differences in order to detect commercial-break information WBI.

In the example of use of the embodiment shown in the Figures the user of the hard-disk recorder 1 activates the recording mode by means of the keyboard 5 in order to record the film "Casablanca" on the hard disk. Subsequently, the film information F and F2, the announcement information AI and the commercial-break information WBI are recorded and, parallel thereto, the television signal FS is applied to the commercial-break detection device 7.

The detection means 8 detect no black-frame information SBI and only a small number of scene changes in the first film information FI and store corresponding scene change information SCI in the memory means 9. At the instant t2 the detection means 8 detect a large number of comparatively short scenes and corresponding scene change information SCI is stored in the memory means 9.

At the end of the first commercial message WSI1, a time interval T1=20 seconds after the instant t2, the detection means 9 detect a sequence (x) of black-frame information SBI not preceded by a fade-out FO and supply edge black-frame time information KI1 to the memory means 9 in order to be stored. In the second commercial message WSI2 the detection means 8 detect a sequence (x) of black-frame information SBI not preceded by a fade-out FO, both a time interval T2=5 seconds after the beginning of the second commercial message WSI2 and a further time interval T3=15 seconds later. Corresponding edge black-frame time information KI2 and KI3 is stored in the memory means 9.

In the third commercial message WSI3 the detection means 8 detect two sequences (x) of black-frame information SBI each preceded by a fade-out FO. The detection means 8 detect corresponding fade black-frame time information FI5 and FI6 and store this information in the memory means 9. A time interval T4=27 seconds after the beginning of the third commercial message WSI3 and a time interval T5=10 seconds after the beginning of the fourth commercial message WSI4 the detection means 8 each time detect a further sequence (x) of black-frame information SBI not preceded by a fade-out FO. Corresponding edge black-frame time information KI4 and KI5 is stored in the memory means 9.

Upon the last detection of a sequence (x) of black-frame information SBI not preceded by a fade-out FO the analysis means 10 of the commercial-break detection device 7 are adapted to analyze the information stored in the memory means 9. This is because at this instant it is certain that no longer any commercial message of a commercial break will be received and the recording position of the previously received and recorded commercial-break information WBI can already be determined.

It is to be noted that the commercial-break detection device 7 could also analyze the information stored in the memory means 9 at an arbitrary later instant in order to determine commercial-break position information WP.

In a first step of analyzing the stored information the time difference means 11 read stored edge black-frame time information KI from the memory means 9 and determine time differences between these units of edge black-frame time information KI as units of first time difference information DZI1. The time difference means 11 then determine the time differences T2, T3, T4 and T5 between adjacent units of edge black-frame time information KI, only those times being considered at which no black-frame information SBI has been detected. In addition, the time difference means 11 also determine the time differences between each time two further adjacent units of edge black-frame time information KI. Thus, time differences T6, T7, T8 and T9 are determined.

The time difference information DZI1 determined by the time difference means 11 is applied to the test means 12. The test means 12 are adapted to test whether one of the units of the determined first time difference information DZ1 lies within a unit of first preset time difference information DZVI1 and they store the tested edge black-frame time information KI as commercial-break position information WSPI in the case of a positive result of the test. The commercial-break position information WSPI thus identifies the recording position of the commercial-break information WSI on the recording medium.

The units of first preset time difference information DZVI1 are selected in accordance with the customary commercial message length of 10, 15, 20, 30, 40 or 60 seconds as 9.5 to 10.5, 14.5 to 15.5, 19.5 to 20.5, 20.5 to 30.5, 39.5 to 40.5 and 59.5 to 60.5 in order to allow for slight deviations from the nominal customary commercial message length. The test means 12 consequently check which of the time differences T2 to T9 fall within these units of first preset time difference information DZVI1.

The test means 12 select the edge black-frame time information KI1 and KI3 as the result of this test and as the result of the first analysis step the test 12 and the edge black-frame time information KI4 and KI5 having the time difference T5=10 seconds as the commercial message position information WSPI of two commercial messages. Thus, the commercial message information WSI2 of the second commercial message and the commercial message information WSI4 of the fourth commercial message are detected and identified as commercial messages by the commercial-break detection device 7.

By also determining time differences for units of edge black-frame time information KI which are not directly adjacent the advantage is obtained that the second commercial message is also recognized as such although the directly adjacent units of edge black-frame time information KI1 and KI2 have a time difference of T2=5 seconds, which does not correspond to any of the units of first preset time difference information DZVI1.

In the first analysis step of the analysis means the first commercial-message information WSI1 is not recognized because at the beginning of the first commercial-message information WSI1 only fade black-frame time information FI4 but no edge black-frame time information KI has been detected. The third commercial-message information WSI3 is not detected in the first analysis step of the analysis means 10 because the commercial message length T4=27 seconds of the third commercial-message information WSI3 has an unusual value and does not fall within any one of the units of the first preset time difference information DZVI1.

In a second analysis step of the analysis means 7 the commercial-message position information WSPI of the second commercial-message information WSI2 and that of the fourth commercial-message information WSI4, which have been determined in the first analysis step, are applied to the logic means 13. The logic means 13 are then adapted to combine the detected commercial-message information WSI2 and the commercial-message information WSI4 to commercial-break information WBI when the respective commercial-message position information has been recorded within a first preset position range VP1 and can thus be assigned to a commercial break with a high probability.

In FIG. 2 the first preset position range VPI starting from the commercial-message position information WSPI=KI3, which marks the end of the second commercial-message information WSI2, is shown. The first preset position range VPI now corresponds to a length of 90 seconds. As is apparent from FIG. 2A, the second commercial-message information WSI2 and the fourth commercial-message information WSI4 are in direct proximity, for which reason the commercial-message position information WSPI=KI4 and WSPI=KI5 of the fourth commercial-message information WSI4 are within the first preset position range VP1.

The logic means 13 therefore define the commercial-message position information WP=KI1, which marks the beginning of the second commercial-message information WSI2, and the commercial-message position information WP=KI15, which marks the end of the fourth commercial-message information WSI4, as the result of the second analysis step of the analysis means 10.

The second analysis step of the analysis means 7 have the advantage that even if a commercial message such as the third commercial-message information WSI3 within a unit of commercial-break information WBI is not detected, it is also skipped automatically during replay of the recorded television signal AFS.

In a third analysis step of the analysis means 7 allowance is now made for the fact that the first commercial message of a commercial break usually does nor begin with a sequence ⓧ of black-frame information SBI not preceded by a fade-out FO, as can usually be observed with subsequent commercial messages of a commercial break. For this purpose, the commercial-break position information WP determined in the second analysis step is applied to the time difference means 11, which now determine second time differences as second time difference information DZI2.

As second time difference information DZI2 the time differences T1, T10 and T11 are determined, which occur between that (?) of the commercial-break position information WP=KI1 and adjacent fade black-frame time information FI2, FI3 and FI4. Likewise, time differences will be determined starting from the commercial-break position information WP=KI5 when adjacent fade black-frame time information FI is detected after the commercial-break position information WP=KI5.

In the third analysis step the test means 12 now check whether one of the second time differences T1, T10 or 11 lies within second preset time difference information DZVI2. Here, the second preset time difference information DZVI2 corresponds to the first preset time difference information DZVI1, but this is not necessary. In the third analysis step the test means 12 determine that the length T1=20 seconds corresponds to one of the units of the second preset time difference information DZVI2 and, consequently, to a typical commercial break length. The test means 12 therefore identify the fade black-frame time information FI4 as commercial-break position information WP1 and the edge black-frame time information KI5 as commercial-break position information WP2 and supply this information to the logic means 13. This commercial-break position information WP1 and WP2 is applied to the recording and reproducing means 6 and is stored therein for a subsequent reproducing mode.

This has the advantage that the first commercial message of a commercial break is also recognized in a reliable manner by the commercial-break detection device 7.

The commercial-break detection device 7 now also includes announcement information detection means 14 which serve to determine whether within a second preset position range VP2 around the commercial-break position information WP1 and WP2 fade black-frame time information FI appears with scene change information SCI having a value above the scene change threshold value SCW. The announcement information detection means 14 are adapted to select this fade black-frame time information FI as announcement position information AI in the case of a positive test result.

In a fourth analysis step the determined commercial-break position information WP1 and WP2 is applied to the announcement information detection means 14. The announcement information detection means 14 subsequently detect that the units of fade black-frame time information FI1, FI2 and FI3 are within the second preset position range VP2 and that the scene change information SCI already has a value above the scene change threshold value SCW from the fade black-frame time information FI1 onwards.

As the result of the fourth analysis step the announcement information detection means 14 select the fade black-frame time information FI1 as announcement position information API1 and the fade black-frame time information FI4 as announcement position information AP12. The announcement information detection means 14 supply the announcement position information API1 and API2 thus determined to the recording and reproducing means 6.

This has the advantage that when the reproducing mode is active the recording and reproducing means 6 skip the announcement information AI and/or the commercial-break information WBI, as desired by the user (control information SD and the film "Casablanca" can be played back without any interruptions or only with interruptions desired by the user. The advantageous feature of the commercial-break detection device 7 of the hard-disk recorder 1 is that commercial breaks are detected in a particularly reliable manner and detected commercial breaks are marked.

It is to be noted that a commercial-break detection device in accordance with the invention may be included in a multitude of recording and/or reproducing apparatuses. A commercial-break detection device in accordance with the invention could be included, for example, in a television set, a computer, a video recorder, a DVD recorder or other apparatuses in the field consumer electronics.

It is to be noted that the detection means could also be adapted to detect monochrome picture content and that the analysis means could analyze monochrome picture content, depending on whether it is preceded or not preceded by a fade-out, in order to detect commercial-break information.

It is to be noted that commercial breaks detected by the commercial-break detection device could be marked in such a manner that the next commercial break detected can be skipped by the actuation of a key of the keyboard or a remote control. This is particularly advantageous when only two parts of a commercial break have been detected and the second part of the commercial break can be skipped by actuation of the key.

It is to be noted that the commercial-break detection device could also analyze the relevant jingle of a commercial break of a television station in order to achieve a further improvement of the reliability of the detection of a commercial break.

The invention claimed is:

1. A commercial-break detection device for the detection of commercial-break information present in picture information of a television signal, having detection means arranged to receive the television signal and adapted to detect black-frame information in the picture information of the television signal, and having memory means for the storage of black-frame time information for each one of at least two units of detected black-frame information, and having analysis means for analyzing the stored black-frame time information and for determining commercial-break position information identifying the commercial-break information in the picture information, wherein the detection means is adapted to detect a fade-out, in which fade-out a luminance signal of the picture information decreases during a fade-out time until the picture information is formed by the black-frame information, and the detection means are adapted to determine fade black-frame time information and edge black-frame time information, the fade black-frame time information identifying black-frame information which is directly preceded by a fade-out, and the edge black-frame time information identifying black-frame information which is not directly preceded by a fade-out, and the analysis means are adapted to separately analyze the stored fade black-frame time information and the stored edge black-frame time information, in order to determine the commercial-break position information.

2. A commercial-break detection device as claimed in claim 1, wherein time difference means are includes, which means are adapted to determine first time difference information between one of the units of edge black-frame time information and at least two adjacent units of edge black-frame time information, and test means are included, which test means serve to check whether one of the units of first time difference information thus determined is present within first preset time difference information, and the test means, in the case of a positive result of the test, are adapted to define the tested edge black-frame time information (KI) as commercial-message position information.

3. A commercial-break detection device as claimed in claim 2, wherein logic means are included, which means are adapted to combine the defined units of commercial-message position information and to define the commercial-break position information, when the units of commercial-message position information have been defined within a first preset position range.

4. A commercial-break detection device as claimed in claim 3, wherein the time difference means is adapted to determine second time difference information between one unit of the edge black-frame time information of the detected commercial-break time information and at least one temporally adjacent unit of fade black-frame time information, and the test means are adapted to check whether one of the detected units of second time difference information is present within second preset time difference information, and the test means, in the case of a positive result of the test, are adapted to define the tested fade black-frame time information as commercial-break position information.

5. A commercial-break detection device as claimed in claim 4, wherein announcement information detection means are included, which means serve to determine whether within a second preset position range around the commercial-break position information fade black-frame time information appears with scene change information having a value above a scene change threshold value, and the announcement information detection means are adapted to select this fade black-frame time information as announcement position information in the case of a positive result of the test.

6. A recording and reproducing apparatus having recording means for recording film information and picture information of a television signal, which picture information includes commercial-break information, reproducing means for reproducing the film information and for skipping the commercial-break information during reproduction of the picture information of the recorded television signal a commercial-break detection device for determining the commercial break information based on the fade black-frame time information identifying black-frame information which is directly preceded by a faded-out, and the edge black-frame time information identifying black-frame information which is mot directly preceded by the fade-out, wherein the fade out is a luminance signal decreasing during a fade-out time until the picture information is formed by black frame information.

7. A recording and reproducing apparatus as claimed in claim 6, wherein the recording means is a hard disk.

* * * * *